United States Patent [19]

Evans

[11] 4,327,604
[45] May 4, 1982

[54] CONTINUOUSLY VARIABLE TRANSMISSION

[76] Inventor: Rix E. Evans, 3716 Sunset Ave., Rocky Mount, N.C. 27801

[21] Appl. No.: 79,547

[22] Filed: Sep. 27, 1979

[51] Int. Cl.³ ............................ F16H 3/44; F16H 3/74
[52] U.S. Cl. ........................................ 74/751; 74/793; 74/682
[58] Field of Search ................. 74/674, 750 R, 752 B, 74/682, 751, 793, 768

[56] References Cited

U.S. PATENT DOCUMENTS

| | | | |
|---|---|---|---|
| 1,874,756 | 8/1932 | Kelly | 74/768 |
| 2,003,108 | 5/1935 | Dodge | 74/751 X |
| 2,803,151 | 8/1957 | Clerk | 74/751 |
| 2,972,909 | 2/1961 | Miller | 74/751 |
| 3,051,021 | 8/1962 | Miller | 74/751 |
| 4,080,847 | 3/1978 | Thomas | 74/682 X |

FOREIGN PATENT DOCUMENTS 399629 10/1933 United Kingdom .................. 74/751

Primary Examiner—Leslie Braun
Assistant Examiner—Lawrence J. Gotts
Attorney, Agent, or Firm—Mills and Coats

[57] ABSTRACT

A continuously variable ratio power transmission for a motor vehicle consists of two planetary gear sets and overrunning clutches to continuously modify said transmission reduction ratio as a function of the output shaft load conditions. A continuously variable ratio power transmission for a motor vehicle wherein one planetary gear set divides the input shaft torque and speed between two driven members of said planetary gear set which comprise the driving members of a second planetary gear set whose direction of angular motion is determined by overrunning clutches to limit the maximum reduction ratio range possible. A transmission of the aforementioned configuration allows a continuous change of reduction ratio as the magnitude of the torque delivered to the input shaft approaches the magnitude of the torque demanded by the output shaft load. The continuous change of reduction ratio allows the input shaft, and hence, the engine, to operate at nearly constant load conditions.

1 Claim, 3 Drawing Figures

4,327,604 sec. A-A sec. B-B

CONTINUOUSLY VARIABLE TRANSMISSION

BACKGROUND OF THE INVENTION

The present invention relates to an apparatus for providing a continuous shift of speed reduction ratio of the output shaft relative to the input shaft as a function of the output shaft load torque. During the operation of a motor vehicle, there are many different load conditions to which a motor vehicle is subjected. Prominent of these load generating conditions include, but are not limited to, inertia, rolling resistance, and gravity during hill climbing. Spark-Ignition, Turbine, and Compression-Ignition engine equipped vehicles, particularly, are limited in their ability to provide sufficient torque while maintaining acceptable overall engine efficiency over such a wide range of load conditions due to the inherent narrow useable power band of said engines. It is, therefore, necessary to equip said vehicle with a transmission that is capable of amplifying the engine torque as is necessary to accomodate external loads that are encountered by the vehicle, and to decrease the speed reduction ratio of the output shaft relative to the input shaft during light load conditions to promote a relatively higher efficiency of the engine.

One solution to the aforementioned problem is to install a transmission in the power train from which several predetermined fixed reduction ratios can be selected either manually by the operator, or by a transducer so mounted that the reduction gearing arrangement is engaged hydraulically upon the appropriate signal from the transducer. A fixed reduction ratio transmission has the inherent drawback that it often forces the engine to operate in an inefficient portion of the engine useable powerband, causing fuel waste, excessive engine wear, and poor vehicle performance.

SUMMARY OF THE INVENTION

The object of the present invention is to provide an apparatus for tailoring the input speed and torque of a power source to the load of the output driven member continuously, thereby increasing engine efficiency, from which performance and fuel consumption rate are improved. The present invention is constructed such that the output load torque is compared to the available input torque to mechanically determine the proper speed reduction ratio.

DETAILED DESCRIPTION

Figure 1:
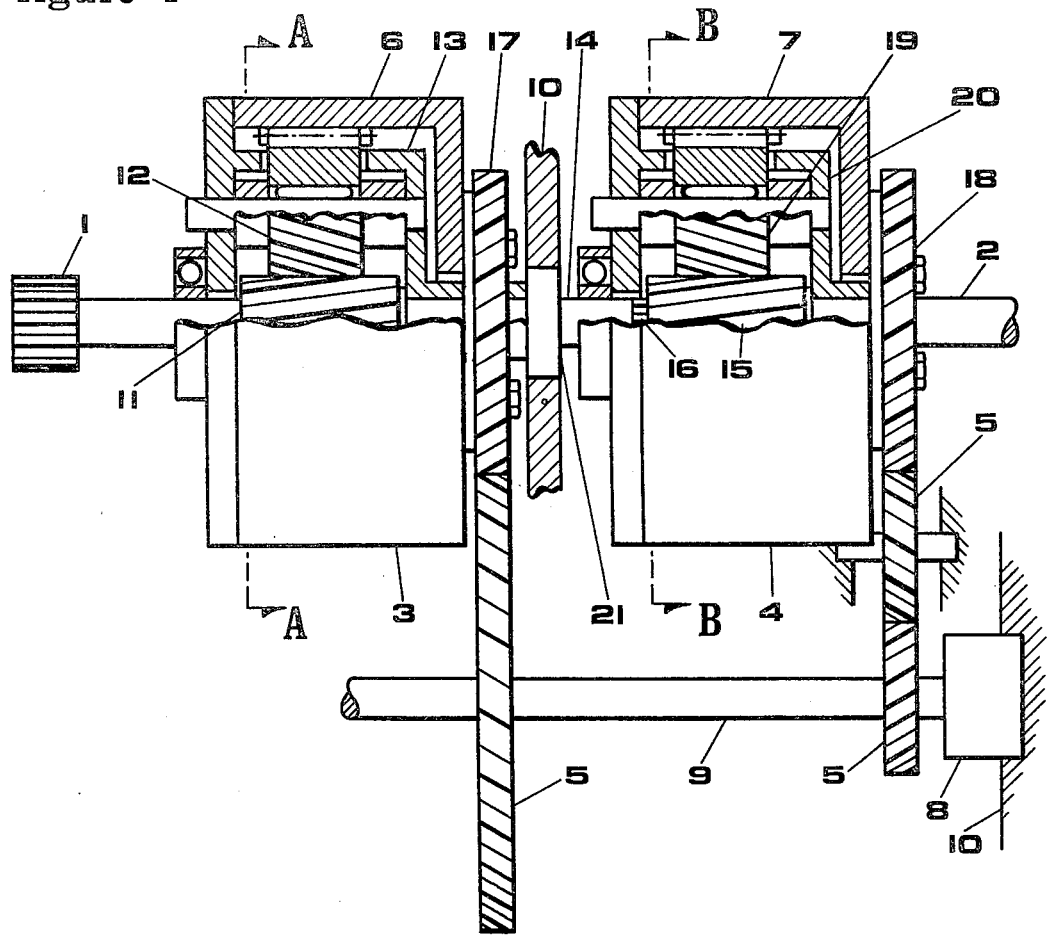
FIG. 1 is a side elevational view of the transmission.

Shown in FIG. 1 is an illustration of the continuously variable transmission introduced in the present invention. In the case of this illustration, said transmission is comprised of two planetary gear sets; a primary drive unit (3), and a secondary drive unit (4). The annulus of the primary drive unit (6) is rigidly connected to the annulus of the secondary drive unit (7) by parallel shaft gearing (5, 17, 18) such that the direction of angular motion of the primary drive unit annulus (6) is opposite, but not necessarily equal to, the angular motion of the secondary drive unit annulus (7). An overrunning clutch (8), is comprised of a race that is rigidly connected to the countershaft (9), and a rotor that is rigidly connected to the transmission housing (10).

The purpose of this clutch is to prevent rotation of the primary drive unit annulus (6) in the wrong direction, which would cause an infinite speed reduction ratio, resulting in no motion of the output shaft (2). This condition would occur as the load torque about the output shaft (2) increases to a high magnitude relative to the magnitude of the torque delivered to the input shaft (1). On the end of the input shaft (1) is the sun gear (11), which meshes with the planet gears (12), whose shaft is supported by the primary drive unit carrier (13). The primary drive unit carrier (13) converges to a shaft (14) that engages the secondary drive unit sun gear (15) by means of splines (16). The primary drive unit annulus (6) is rigidly bolted to the parallel shaft gear (17) such that the parallel shaft gear (17) rotates freely about the primary drive unit carrier shaft (14). The power from the parallel shaft gear (17) is transferred by meshing parallel shaft gears (5) through the countershaft (9) to parallel shaft gear (18) which is rigidly bolted to the secondary drive unit annulus (7). The bore clearance between the parallel shaft gear (18) and the output shaft (2) is sufficient to permit free rotation of gear (18) about the output shaft (2). The secondary drive unit sun gear (15) engages the secondary drive unit planet gears (19) whose shaft is supported by the secondary drive unit carrier (20), whereby the carrier (20) converges to form the output shaft (2).

Figure 2:
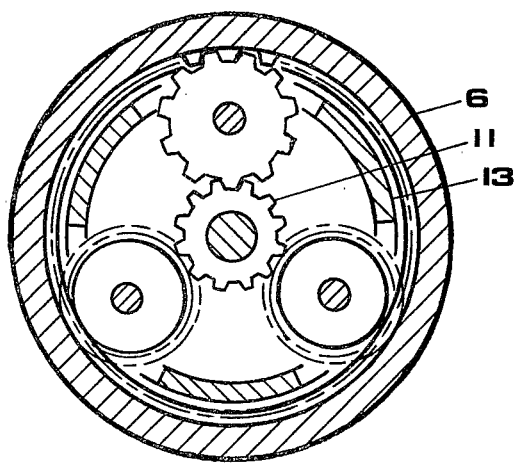
FIG. 2 is a section viewed along the A—A line shown in FIG. 1.

FIG. 2 is a section viewed along the A—A line shown in FIG. 1. The sun gear (11) is the driver member. The carrier (13) and the annulus (6) are the driven members.

Figure 3:
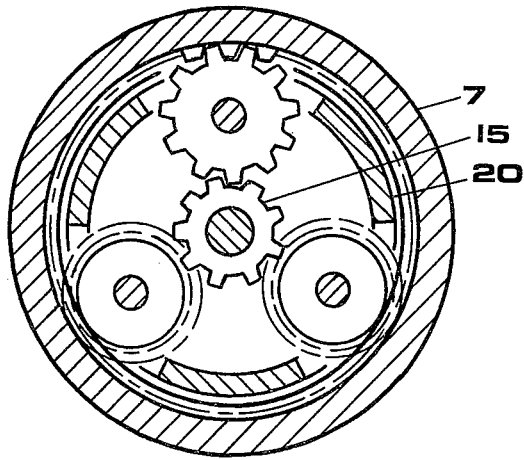
FIG. 3 is a section viewed along the B—B line shown in FIG. 1.

FIG. 3 is a section viewed along the B—B line shown in FIG. 1. The sun gear (15) and the annulus (7) are the driving members. The carrier (20) is the driven member.

The reduction range and the shifting schedule for the transmission will be dependent upon the relative sizes of the gears involved.

In the preferred embodiment, the angular motion of the primary drive unit annulus (6), and hence, the secondary drive unit annulus (7), are equal to zero at full load during start-up. Reverse rotation is prevented by the over-running clutch (8). This is shown by the following reasoning. A counter-clockwise torque is applied about the axis of the primary drive unit sun gear (11). The carrier (13) rotates at a reduced speed in a counter-clockwise direction while generating a reaction moment about the axis of the annulus (6) in a clockwise direction. Due to the inherent properties of the present planetary gear set, the reaction torque will have an opposite and greater magnitude than the delivered torque to the sun gear (11). Since the primary drive unit carrier (13) and the secondary drive unit sun gear (15) are on the same inter-connecting shaft (14), both rotate with the same angular motion. The secondary drive unit annulus (7) is connected to the primary drive unit annulus (6) through an odd number of parallel shaft gears so as to force the aforementioned reaction torque generated on the primary drive unit annulus (6) to act in the same direction about the axis of the secondary drive unit as the sun gear (15).

As the load torque decreases at the output shaft (2), the magnitude of the reaction torque generated by the secondary drive unit planet gears (19) decreases. As the vehicle speed nears a constant value, the load torque drops, since a relatively large torque is required to accelerate the vehicle. When the magnitude of the load torque drops to such a magnitude that the reaction torque generated by the secondary drive unit planet gears (19) equals the reaction torque delivered from the primary drive unit annulus (6), upshifting commences. The speed reduction ratio of the output shaft (2) relative to the input shaft (1) will continue to decrease as a function of the decreasing load torque. Upshifting will cease when the load torque about the output shaft (2) decreases to a value that will permit static equilibrium to exist about the secondary drive unit planet gear (19) axis. This is true due to the fact that the secondary drive unit carrier (20) has dual driving members, each of which must deliver a portion of the input torque to maintain static equilibrium.

An over-running clutch (21) may be mounted on the primary drive unit carrier (13) connected therewith to the transmission housing to prevent the primary drive unit carrier (13) from rotating in a direction opposite the direction of rotation of the input shaft (1) relative to the transmission housing. This condition might occur during deceleration or descent of a hill whereat the output shaft (2) becomes the driving input, and the input shaft (1) becomes the output load.

As set forth in the preceding paragraphs, the continuously variable transmission introduced in the present invention allows for a definite maximum speed reduction ratio for a large load torque, thence upshifting in a continuous manner until the minimum speed reduction ratio is attained.

While the invention has been described with respect to the details of a preferred embodiment, changes and variations will become apparent to those skilled in the art upon reading this description. Such can be made without departing from the scope of the invention.

What is claimed is:

1. A continuously variable ratio power transmission device having a source of rotated motion operatively connected to an input shaft, the improvement comprising: a primary drive unit in the form of a planetary gear set operatively driven by said input shaft and having a primary drive unit carrier and a primary drive unit annulus; a secondary drive unit in the form of a planetary gear set identical to said primary drive unit, said secondary drive unit having an input shaft operatively connected to the carrier of said primary drive unit and including a secondary drive unit carrier and a secondary drive unit annulus, said secondary carrier being operatively connected to a transmission output shaft; and an anti-reverse mechanism in the form of a pair of parallel shaft gears, one rigidly connected to said annulus of said primary drive unit and the other rigidly connected to said annulus of said secondary drive unit, said shaft gears being operatively interconnected through a pair of parallel shaft gears fixedly mounted on a countershaft whereby speed reduction ratio is determined by the torque delivery to the input shaft versus the load torque inserted on the output shaft with the anti-reverse mechanism limiting the maximum speed reduction ratio range of said transmission.

* * * * *